(12) United States Patent
Martin et al.

(10) Patent No.: US 6,215,069 B1
(45) Date of Patent: Apr. 10, 2001

(54) CABLE MANAGEMENT PANEL ASSEMBLY (75) Inventors: Dale D. Martin, East Lyme, CT (US); Robert C. Baxter, Warwick; Tracy H. Udelson, Westerly, both of RI (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/286,652

(22) Filed: Apr. 6, 1999

(51) Int. Cl.[7] .................................................. H02G 3/04
(52) U.S. Cl. .................... 174/68.3; 174/72 C; 174/95; 211/26
(58) Field of Search ................. 174/70 C, 72 A, 174/72 C, 72 R, 68.1, 68.3, 95, 101; 211/26

(56) References Cited

U.S. PATENT DOCUMENTS

| | | | |
|---|---|---|---|
| 3,494,651 | 2/1970 | Fork et al. ............................ | 292/256 |
| 3,705,949 | * 12/1972 | Weiss .................................. | 174/101 |
| 3,786,171 | 1/1974 | Shira .................................... | 174/48 |
| 3,890,459 | * 6/1975 | Caveney .............................. | 174/68.3 |
| 3,906,146 | * 9/1975 | Taylor ................................. | 174/101 |
| 4,124,324 | 11/1978 | Augis et al. ............................ | 404/3 |
| 4,136,257 | * 1/1979 | Taylor ................................. | 174/68.3 |
| 4,484,020 | * 11/1984 | Loof et al. ........................... | 174/101 |
| 4,534,147 | 8/1985 | Cristell ................................ | 52/287 |
| 4,800,695 | 1/1989 | Menchetti ............................ | 52/221 |
| 5,091,607 | 2/1992 | Stob ..................................... | 174/48 |
| 5,125,199 | 6/1992 | Whitney et al. ..................... | 52/221 |
| 5,154,030 | 10/1992 | Harms ................................. | 52/239 |
| 5,595,494 | 1/1997 | Wiebe ................................. | 439/211 |
| 5,661,263 | 8/1997 | Salvaggio ............................ | 174/48 |
| 5,663,527 | * 9/1997 | Hui ..................................... | 174/68.3 |
| 5,704,175 | 1/1998 | Lewis ................................. | 52/288.1 |
| 5,765,698 | 6/1998 | Bullivant ............................. | 211/26 |
| 5,792,992 | 8/1998 | Handler .............................. | 174/101 |

OTHER PUBLICATIONS

Hubbell Premise Wiring Full Line Catalog #1100R No date.

* cited by examiner

*Primary Examiner*—Kristine Kincaid
*Assistant Examiner*—Adolfo Nino
(74) *Attorney, Agent, or Firm*—Jerry M. Presson; Mark S. Bicks

(57) ABSTRACT

A modular cable management panel assembly includes a panel, a set of rings mounted on a surface of the panel and a cover coupled to the rings. The rings are spaced along the panel longitudinal axis and have openings extending laterally through them. The cover is movable between a closed position extending over and closing the ring openings and an open position spaced from the ring openings to allow cables to pass laterally into and out of the rings. The panel assembly is adaptable for mounting various accessories.

24 Claims, 6 Drawing Sheets

CABLE MANAGEMENT PANEL ASSEMBLY

FIELD OF THE INVENTION

The present invention relates to a modular cable management panel assembly for supporting and guiding cables or wires coupled to cross connectors and other apparatus mounted in cabinets and racks of network systems. More particularly, the present invention relates to a modular cable management panel assembly having rings with openings for receiving the cables, with a movable cover coupled to the rings for opening and closing the openings in the rings and with a reduced number of fasteners.

BACKGROUND OF THE INVENTION

Cable management accessories are key components of cross connect systems for networks. Although good cable management may not positively enhance network performance, poor cable management will detract from the network performance. Additionally, cable management accessories are not only necessary, but can improve the visual image of the overall network installation.

Cable management accessories perform the pragmatic function of organizing the structure for facilitating installation, moving, adding and changing the system. Additionally, an aesthetic cable management conveys the impression of attention to detail and of the craftsmanship of the installer.

Cable management panel assemblies must be adaptable and compliment existing rack structures. A modular panel assembly can be adapted to a wide variety of environments. As used herein, cable management refers to the routing of cables terminated in a rack mounting environment. Specifically, cables will need to be organized and structured in extending from the cross connect horizontally, vertically and between fronts and backs.

A conventional cable management panel comprises plastic or metal cable guides that are mounted in a row across the panel. Cable guides can be split D-rings or laterally open rings which are bolted to one of the panel surfaces. Although the rings have openings to receive the cables, they do not have effective mechanisms for closing those openings. Additionally, they include a significant number of fasteners for attaching accessories to the panels.

SUMMARY OF THE INVENTION

An object of the present invention is to provide a cable management panel assembly which can be made in modular form and has an effective mechanism for providing a cover for selectively closing the openings in the rings of the assembly.

Another object of the present invention is to provide a cable management panel assembly which is highly adaptable to different environments, can be used with or without a door for closing the ring openings and has mountings for additional accessories employing a minimum number of fasteners.

A further object of the present invention is to provide a cable management panel assembly which is simple and inexpensive to manufacture and use, has an aesthetic appearance, and is of rugged construction.

The foregoing objects are basically obtained by a cable management panel assembly comprising a panel, a set of rings and a cover. The panel has oppositely directed first and second surfaces and extends along a longitudinal axis. The rings are mounted and extend outwardly from the first surface and are spaced along the longitudinal axis. Each ring has an opening extending laterally through it. A cover is coupled to the rings and is moveable between its closed position extending over and closing the openings and its open position spaced from the openings to allow cables to pass laterally into and out of the rings.

By forming the cable management panel in this manner, the panel can be modular and can be adapted to a wide variety of environments by changing the size, arrangement and number of rings provided on the panel. The cover can be moved between its open and close positions to allow access to the interior of the rings for placing cables therein and removing cables therefrom, or for securing the cables within the rings and providing a neat and aesthetic overall appearance. Increased reliability in service is provided by using a minimum number of fasteners and by the basic rugged design of the rings.

Such terms as front, back, top, bottom, side, upper, lower, inner and outward are only intended to refer to relative positions or locations. Those terms do not limit the cable management panel assembly to any specific orientation.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
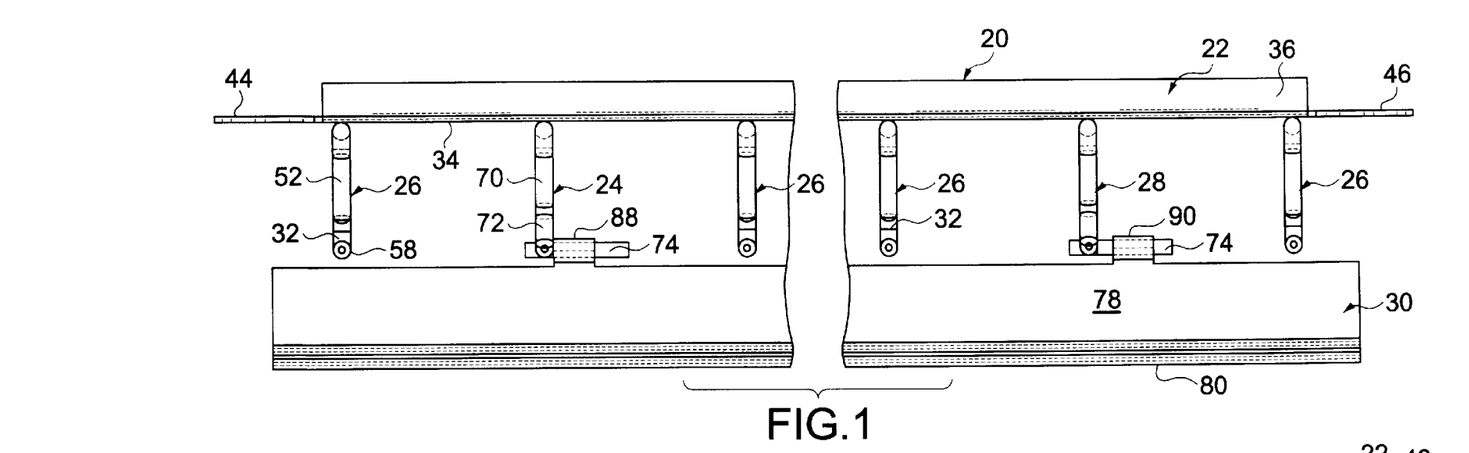
FIG. 1 is a partial, top elevational view of a cable management panel assembly according to a first embodiment of the present invention, with the cover in an open position.
Figure 2:
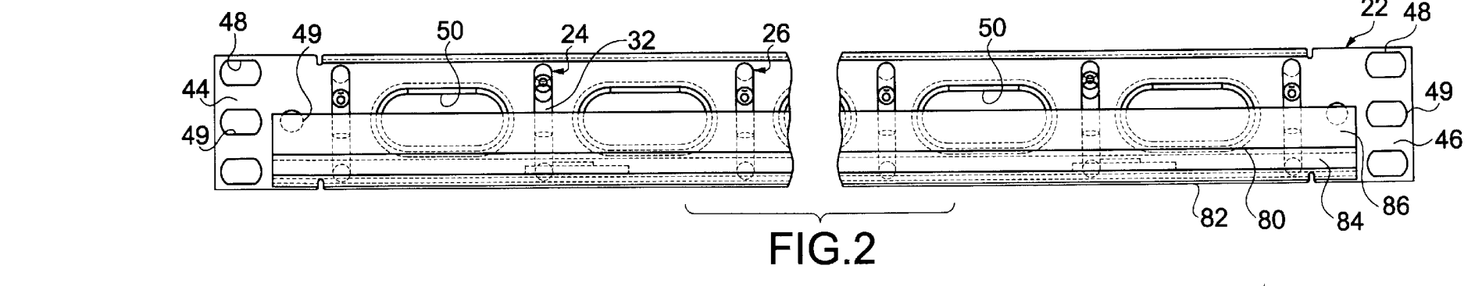
FIG. 2 is a front elevational view of the cable management panel assembly of FIG. 1, with the cover in an open position.
Figure 3:
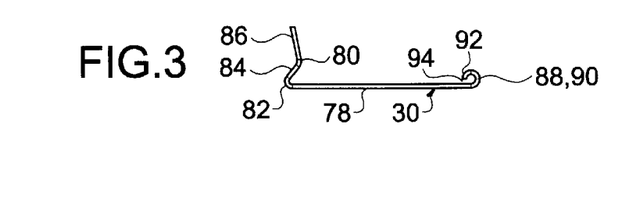
FIG. 3 is a side elevational view of the cover of the cable management panel assembly of FIG. 1.
Figure 4:
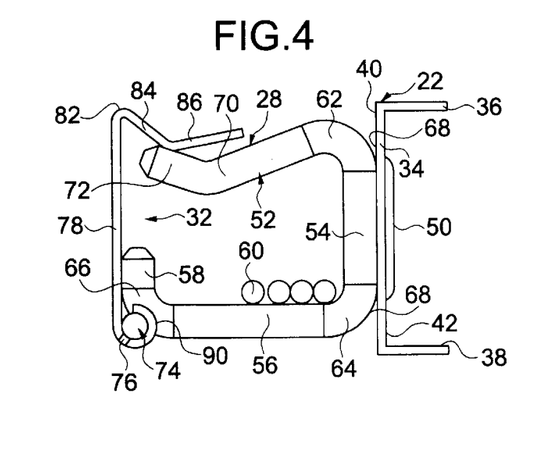
FIG. 4 is a side elevational view of the cable management panel assembly of FIG. 1, with the cover in its closed position.
Figure 5:
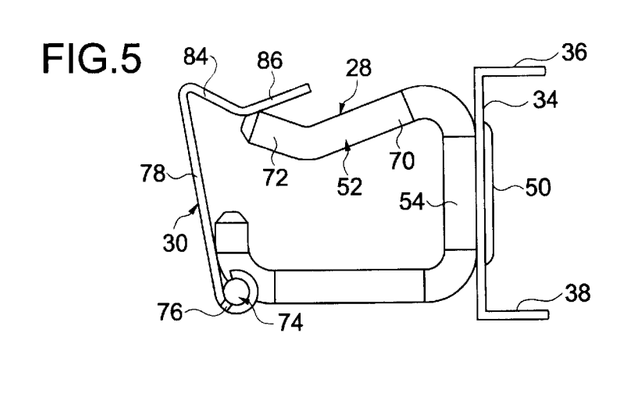
FIG. 5 is a side elevational view of the cable management panel assembly of FIG. 1 with the cover in the process of being moved between a closed position and an open position or vice versa.
Figure 6:
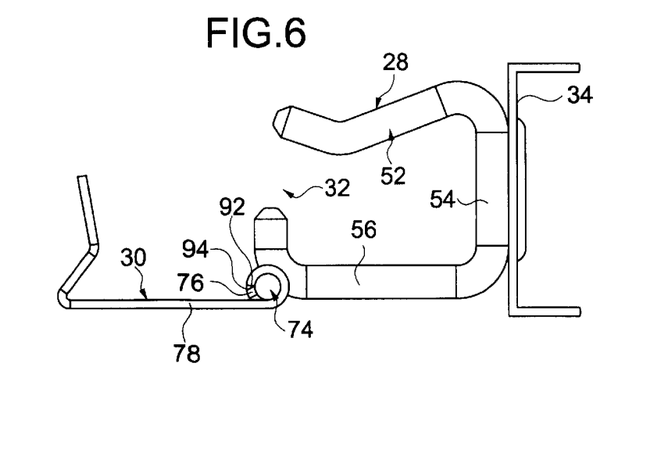
FIG. 6 is a side elevational view of the cable management panel assembly of FIG. 1 with the cover in an open position and at an angle for removal of the cover.
Figure 7:
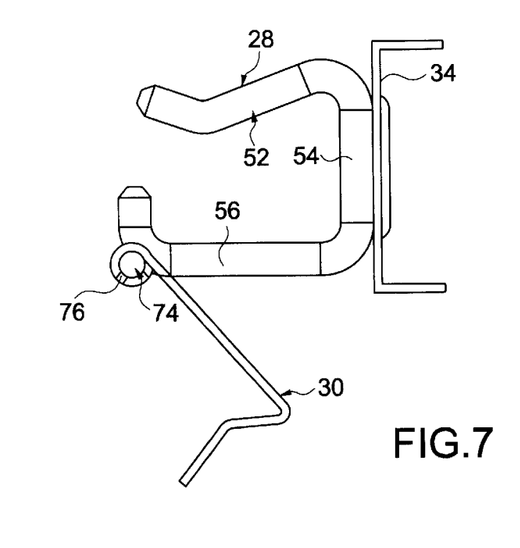
FIG. 7 is a side elevational view of the cable management panel assembly of FIG. 1 with the cover in its fully open position.
Figure 16:
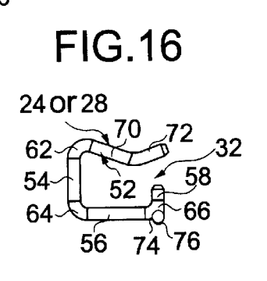

Referring initially to FIGS. 1–3, cable management panel assembly 20 according to the first embodiment of the present invention comprises a panel 22, a plurality of rings 24, 26 and 28 forming a first ring set and a cover 30. The rings are mounted on and extend laterally outwardly from the panel, and are spaced along the panel longitudinal axis. Each ring has an opening 32 extending laterally through it. The rings are of the forms illustrated in FIGS. 16 and 18. The cover is coupled to the rings and is movable between the closed position, as shown in FIG. 4, extending over and closing openings 32 and open positions, as shown in FIGS. 6 and 7, spaced from the openings to allow cables to be inserted laterally into or removed from the rings.

As best illustrated FIGS. 4–7, panel 22 is substantially C-shaped in transverse cross section along most of its length. The C-shaped cross section is defined by a base or main section 34 and legs 36 and 38. Base 34 has a front or first surface 40 and a rear or second surface 42. Legs 36 and 38 extend rearwardly from rear surface 42.

As illustrated in FIGS. 1 and 2, the longitudinal ends of panel 22 are formed as attachment flanges 44 and 46. These attachment flanges are provided with openings 48 for receiving fasteners for attaching the panels to a supporting structure as is conventional in this field. Accessory mounting holes 49 can also be provided in the attachment flanges.

Additional openings 50 can be provided between the various rings to provide access to structure behind the panel and to secure other accessories to the panel. Openings 50 are formed with rolled over edges to prevent cable snags. Rings 24, 26 and 28 of this first ring set are formed of two different types. Hinge rings 24 and 28, which are mounted as the next-to-last rings at the ends of the row of the first ring set on the panel, are identical and are of the first type. Cable rings 26, which are mounted at the ends of the first ring set row and in the row between rings 24 and 28, are identical and are of a second type.

Since hinge rings 24 and 28 are identical only one is described in detail. Referring particularly to FIG. 4, ring 28 comprises a top section 52, a back section 54, a bottom 56 and a front section 58. These sections can be variously described as first, second, third and fourth sections, and define a hollow interior or passageway in which cables 60 are supported. Top section 52 is connected to back section 54 by an acutely angled bend 62. Back section 54 is connected to bottom section 56 by a right angular bend 64. Bottom section 56 is connected to front section 58 by a right angular bend 66. Front section 58 and top section 52 are spaced to define ring opening 32 therebetween.

Back section 54 is fixed to front surface 40 of panel 22. This fixing can be by any suitable attachment, but is preferably accomplished by spot welds 68.

Top section 52 comprises a main portion 70 extending generally outwardly and downwardly from panel front surface 40 and an end portion 72 extending at an obtuse angle to the main portion. In this manner end portion 72 extends upwardly and outwardly from the main portion. Back section 54 extends at an acute angle relative to main portion 70 and is parallel to panel front surface 40. Bottom section 56 extends perpendicularly to panel front surface 40. Front section 58 is perpendicular to bottom section 56 and parallel to back section 54.

A hinge bar or pin 74 is connected to and extends from ring 28 adjacent bend 66. The hinge bar is in the form of a right circular cylinder, extending parallel to the longitudinal axis of panel 22 and to the cable receiving passageway defined by the rings. Typically, the hinge bar is spot welded to the outer periphery of the ring. A stop flange 76 in the form of the generally flat, planar member with a rounded free edge extends from the end of hinge bar 74 remote from ring 28. Flange 76 extends in a radial direction relative to cylindrical hinge bar 74, and extends radially beyond the lateral periphery of the hinge bar.

The hinge bars 74 provide a pivot for attaching the cover to the rings. The stop flanges retain the cover on the hinge bars, while allowing removal of the cover from the rings in one angular orientation of the cover (FIG. 6).

Figure 18:
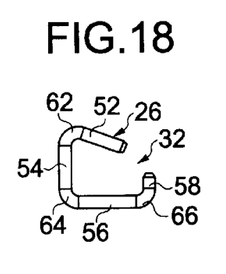

Cable rings 26, as illustrated in FIG. 18, are constructed similar to rings 24 and 28, except that rings 26 do not include end portion 72, hinge bar 74 and stop flange 76. Except for these omissions, each intermediate ring 26 includes the remaining structure of the top section 52, the back section 54, the bottom section 56, and the front section 58.

Cover 30 (FIG. 3) comprises a main part 78 and a latch part 80. Main part 78 is formed by a planar member which is connected to the latch part by a bend 82 forming an acute angle between the main part and the latch part. The latch part includes an inner segment 84 and an outer segment 86. The inner segment is adjacent the main part and extends and forms an acute angle with the main part. The outer part extends at an obtuse angle to the inner segment.

In this manner, inner segment 84 forms a locking, interference fit with ring end portion 72. Outer segment 86 provides a caming surface allowing the resilient cover and/or rings to deform more easily and automatically in the position illustrated in FIG. 5, particularly when the cover is moved from an open position (FIG. 6) to a closed position (FIG. 4). Additionally, outer segment 86 facilitates gripping the cover in closed position. In the closed position, cover 30 can be tensioned or untensioned, and still provide an interference fit by the engagement of end portions 72 and latch part 80.

Opposite to the latch part, i.e., on its upper end in the position illustrated in FIG. 1, cover 30 has hinge parts 88 and 90. Since each of the two hinge parts are identical in configuration only one is described in detail. Each hinge part is an integral or unitary extension of the remainder of cover 30, and is substantially shorter in axial length than the cover.

To form the hinge part the cover is provided with a depending extension extending from the main part 78 (FIGS. 1 and 3). The extension is bent along a curvilinear path to provide a partial right circular cylindrical shape. The hinge part terminates at an end 92 which is spaced from the adjacent surface of main part 78 to define a slot 94 therebetween.

Each hinge part forms a pivoted coupling with one of the hinge bars 74 by extending about and being rotatably or pivotally coupled to the respective hinge bar. The diameter of each hinge part is substantially less than the radial or lateral projections of the stop flanges 76. In all but one angle of position of the cover, the longitudinal ends of the hinge parts engage the stop flanges and the rings adjacent bends 66 to prevent a cover from sliding axially off of the hinge bars.

In one angular position, illustrated in FIG. 6, the stop flanges are aligned with slots 94. Since the slots are wider than the stop flanges, the stop flanges can pass through these slots allowing the cover to slide off the ends of the hinge bars by an axial movement of the pivotable cover to remove the cover from the rings. Similarly, by orienting a separated cover in the angular position illustrated in FIG. 6 to align the cover slots and the ring stop flanges, the hinge parts can be easily slid axially onto the hinge bars to mount and couple the cover to the rings.

During initial network installation, cover 30 can be removed from the panel assembly 20 to facilitate attachment of panel 22 to the appropriate supporting structure and to facilitate mounting of the cables through the rings. Once the cables are in place, cover 30 can be oriented as illustrated in FIG. 6 and mounted onto the rings as described hereinabove. Alternatively, the cover can be moved to its fully opened position, as illustrated in FIG. 7 during the initial mounting. After the installation is completed, the cover can be installed or merely moved to the closed position illustrated in FIG. 4 with main part 78 extending over the ring openings and latch part 80 engaged with end portions 72 of the rings 24 and 28.

Access can be obtained to the interior of the rings for removing, replacing or adding additional cables to the rings by merely disengaging latch part 80 from end sections 72 and pivoting the cover to its open position. The cover is closed by pivoting to the cover to a closed position, allowing the outer segment 86 to cam on the distal end of end section 72 to allow engagement of ring end portions 72 and cover latch part 80.

A cable management panel assembly 100 according to a second embodiment of the present invention is illustrated in FIGS. 8–11. Features of the second embodiment which are similar to those of the first embodiment are denoted with like reference numerals.

Panel assembly 100 has a panel 102 having attachments or gripping members on each rear surface 104 for mounting a second ring set 106. The second ring set is coupled to a second cover 108.

Figure 12:
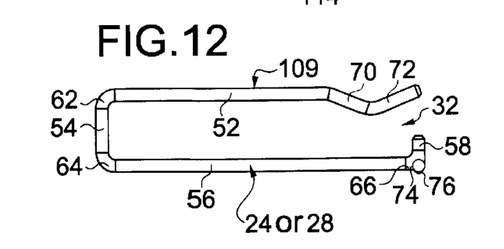
FIG. 12 is a side elevational view of a hinge ring in one form for cable management panel assemblies according to the present invention.
Figure 13:
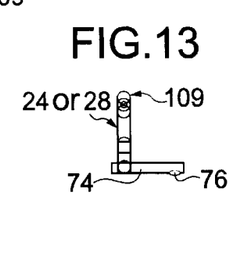
FIG. 13 is a front elevational view of hinge ring of FIG. 12.
Figure 14:
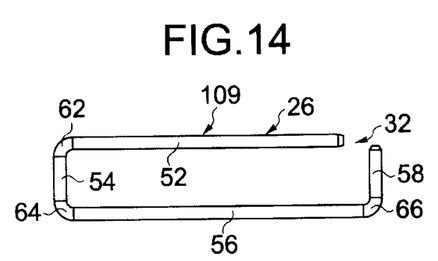
FIG. 14 is a side elevational view of a cable ring in one form for cable management panel assemblies according to the present invention.

Panel 102 also has a first ring set 109 comprising hinge rings 24a and 28a and a plurality of cable rings 26a mounted on that panel in the same manner as disclosed for the first embodiment. Rings 24a, 26a and 28a are welded to the front surface of panel 102 and are formed, along with cover 30, generally as described above for panel assembly 20 of the first embodiment. However, the hinge rings and the cable rings are of somewhat different forms illustrated in FIGS. 12–14.

Panel 102 comprises attachments or griping members in the form of fixed tabs 110 and 112 and resilient tabs 114 and 116. Each of these tabs are formed from unitary portions of panel 102 by cutting and deforming portions thereof.

Figure 8:
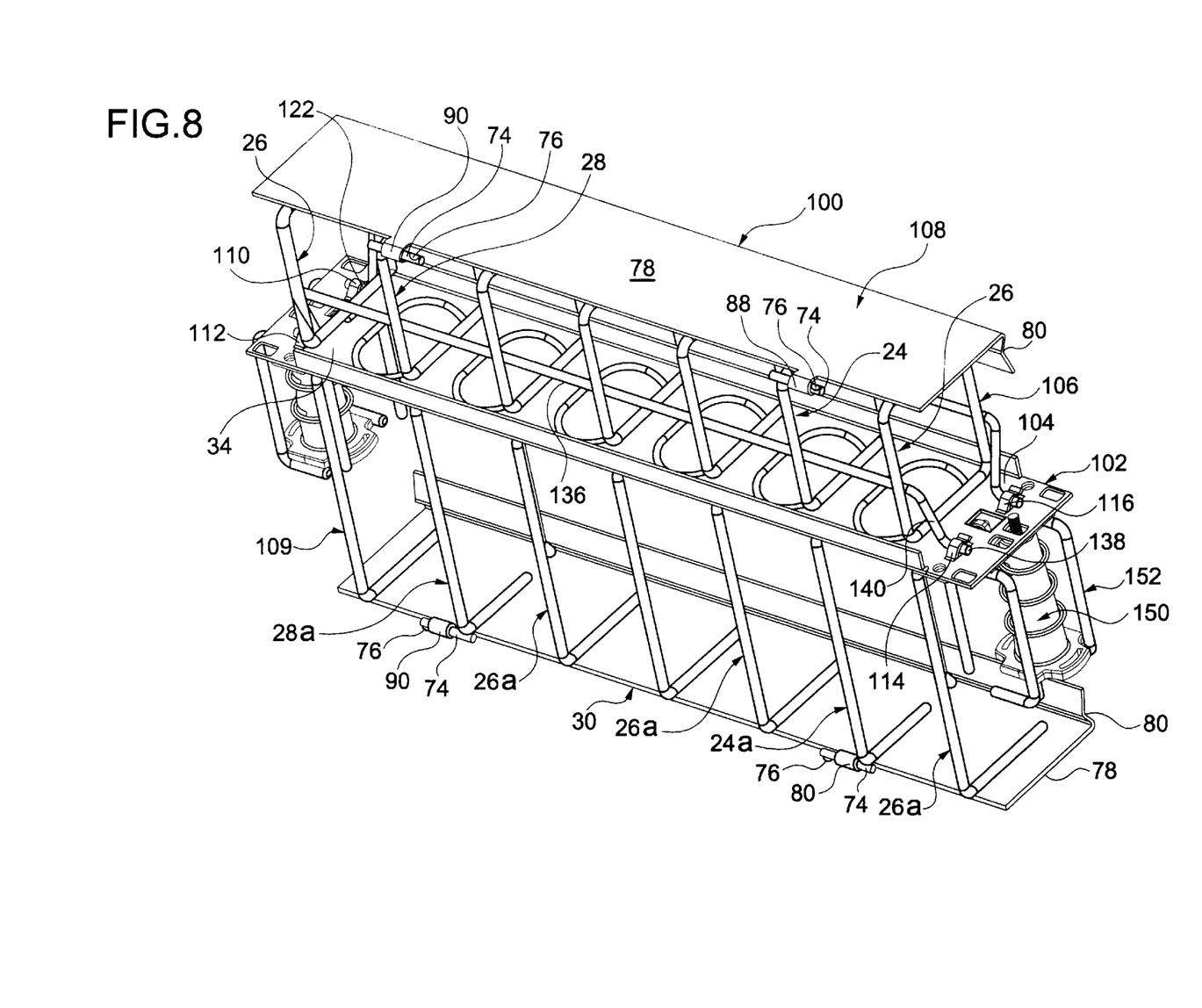
FIG. 8 is a perspective view of a cable management panel assembly according to a second embodiment of the present invention, with a rear side facing upwardly.
Figure 10:
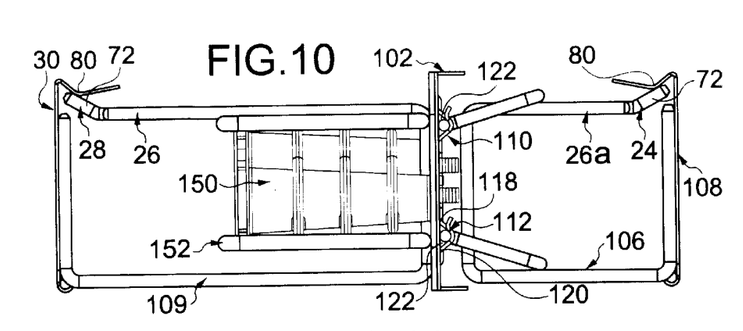
FIG. 10 is a right side elevational view of the cable management panel assembly of FIG. 8.

Fixed tabs 110 and 112, as best illustrated in FIGS. 8 and 10, have their opposite ends 118 and 120 coupled to base panel 34. Between its ends, each fixed tab is bent out of the plane of panel base 34 to define a passage 122 extending parallel to, but offset from, the panel longitudinal axis.

Figure 9:
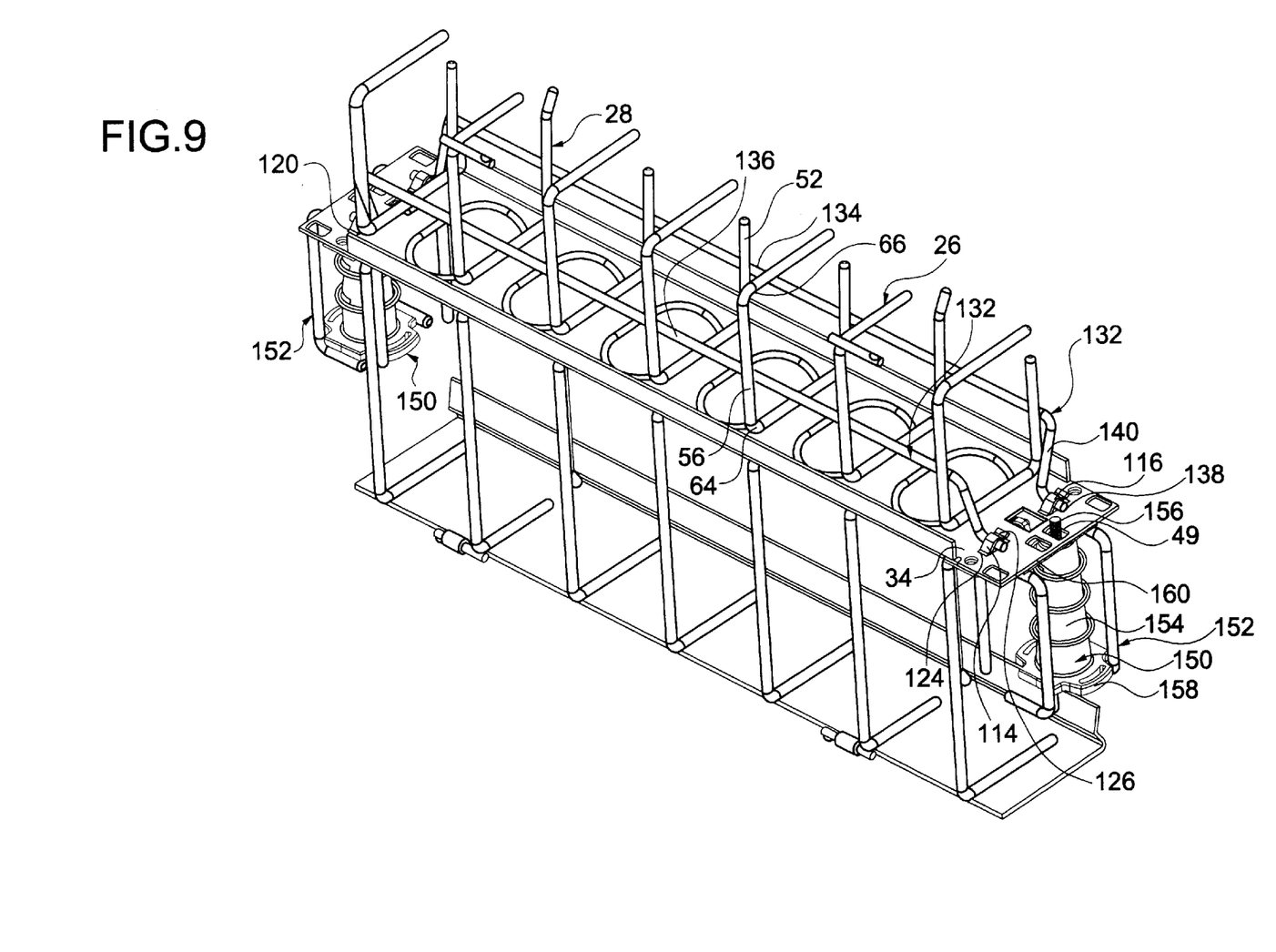
FIG. 9 is a perspective view of the cable management panel assembly of FIG. 8, with the rear cover removed.
Figure 11:
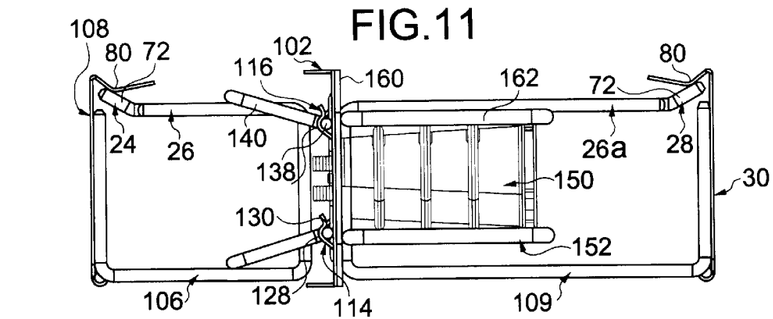
FIG. 11 is a left side elevational view of the cable management panel assembly of FIG. 8, which side view is opposite to that of FIG. 10.

Each of the resilient tabs 114 and 116 are similarly stamped out of panel base 34. Each resilient tab, as best illustrated in FIGS. 8, 9 and 11, has one end 124 (FIG. 9) coupled to base 34 of panel 102 and an opposite or free end 126 (FIG. 9) spaced from panel base 34. Between tab ends 124 and 126, each tab is bowed outwardly to a maximum diameter portion 128 (FIG. 11), and then is bent backwardly toward panel base 34 to a reverse bend 130 (FIG. 11). From reverse bend 130, each resilient tab then extends upwardly and outwardly from the panel base to provide a tapered lead in section.

Figure 15:
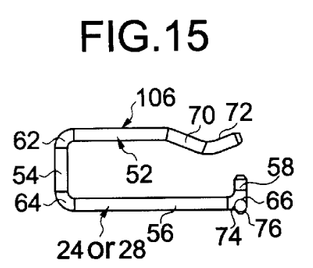
FIGS. 15 and 16 are side elevational views of hinge rings in other forms for cable management panel assemblies according to the present invention.
Figure 17:
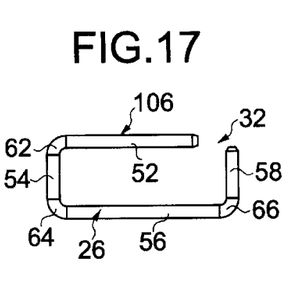
FIGS. 17 and 18 are side elevational views of cable rings in other forms for cable management panel assemblies according to the present invention.

Second ring set 106 comprises hinge rings 24 and 28 and a plurality of cable rings 26 connected to one another by a frame 132 (FIG. 11). Rings 24, 26 and 28 of the second ring set 106 are formed as illustrated in FIGS. 15 and 17. Frame 132 comprises two parallel elongated members 134 and 136. Member 136 is fixedly attached (for example, by spot welding) to each of the rings of the second ring set on top or back sides of bottom sections 56 spaced from bends 64 (FIG. 9) and 66. Elongated member 134 is fixedly attached by spot welding to top or outer sides of top sections 52 of the rings of the second set, between opposite longitudinal ends of each such top section.

The opposite ends of each elongated member has a horizontally extending foot extensions 138 (FIG. 9), connected to the remainder of the respective elongated member by connecting extensions 140. In this manner, the foot extensions extend axially outwardly and are offset to extend along an axis parallel to the longitudinal axis of the respective elongated member.

The foot extensions are sized and shaped to mate with fixed tabs 110 and 112 when inserted within passageways 122 thereof (FIG. 10). The foot extensions on the opposite ends of elongated members 134 and 136 are entrapped with an interference fit between resilient tabs 114 and 116 and rear surface 104 of panel base 34. The configuration of the resilient tabs allows the foot extensions to be snapped into the position illustrated most clearly in FIGS. 9 and 11 by a simple downward pressure. The outwardly facing surfaces of connecting extensions 140 engage the inwardly facing edges of fixed tabs 110 and 112 and resilient tabs 114 and 116 to restrain second ring set 106 from moving in directions parallel to the panel longitudinal axis.

Second cover 108 is formed identically to first cover 30, and is pivotally coupled to hinge rings 24 and 28 of second ring set 106 in the same manner described above for the first embodiment. With the panel assembly of the second embodiment, two cable passageways are provided by the two sets of rings on opposite sides of a single panel. Each set of rings can be operated in the same manner.

Cable management panel assembly 100 can also include accessories in the form of cable management spools 150 and vertical cable guides 152. Each cable management spool 150 comprises a frustoconical section 154 extending substantially perpendicularly from the front surface of panel 102. The narrower end of each spool adjacent panel 102 has an axially extending, externally threaded fastener 156 extending through one of the accessory holes 49 in the panel. Nuts can be threaded on fasteners 156 or mating, internally threaded holes can be provided on panel 100 to secure the cable management spools in place. A perpendicular flange 158 extends laterally and parallel to the panel at the opposite or free wider end of each management spool.

Each vertical cable guide 152 comprises an attachment plate 160 fixed, e.g. by spot welding, to the front surface of panel 102 adjacent one longitudinal end of the panel. Rings 162 are welded to and extend from plate 160, in generally the same manner as rings 24a, 26a and 28a of first ring set 109 extend from panel 102, except the cable passageway defined by rings 162 is perpendicular to the parallel cable passageways of first ring set 109 and second ring set 106. Rings 162 guide and manage cables extending in vertical directions, and are similar in configuration to rings 26 of second ring set 106 illustrated in FIG. 17.

Figure 19:
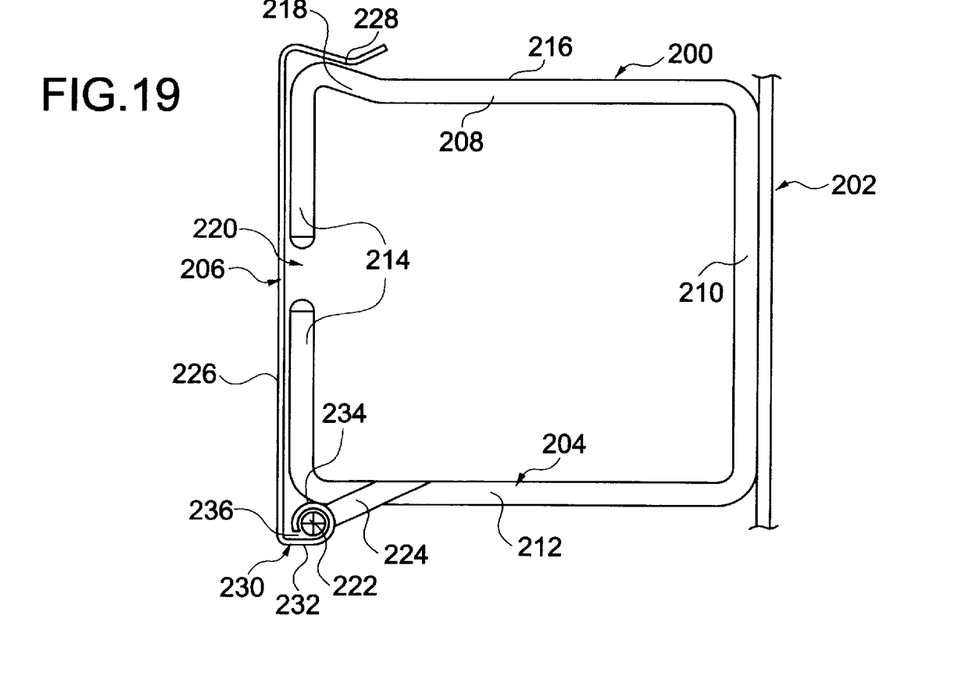
FIG. 19 is a partial, side elevational view of a cable management panel assembly according to a third embodiment of the present invention.

A cable management panel assembly 200 according to a third embodiment of the present invention is illustrated in FIG. 19. Panel assembly 200 includes a panel 202, rings 204 and a cover 206. Only one end ring is illustrated. Panel 202 is similar to panel 22 of the first embodiment, and thus, is not described further in detail.

Ring 204 comprises a top section 208, a back section 210, a bottom section 212 and a front section 214. Top section 208 comprises a main portion 216 and an end portion 218. Main portion 216 extends perpendicularly from back section 210 and from panel 202. End portion 218 extends at an obtuse angle upwardly and outwardly from main portion 216 at the end of main portion 216 remote from panel 202. Back section 210 is fixed to and parallel to the plane of panel 202. Bottom section 212 extends perpendicularly from back section 210 and from panel 202.

Front section 214 is formed of two parts, with the first part depending from the end of end portion 218 remote from back section 210 and the second part extending upwardly from the end of bottom section 212 remote from back section 210. The free ends of the front section parts are spaced by a distance to provide an opening 220 therebetween for passage of cables into and out of rings.

A hinge bar 222 with a stop flange (not shown in FIG. 19) is connected to bottom section 212 by a connecting section 224. Connecting section 224 extends downwardly and outwardly from a portion of bottom section 212 adjacent front section 214.

Cover 206 includes a main part 226 with a latch part 228 at its upper end and hinge parts 230 at its lower end. Cover latch part 228 of the third embodiment is similar to cover latch part 80 of the first embodiment and engages end portion 228 in the same manner, and thus, is not described further in detail.

Each cover hinge part 230 includes a horizontal connector 232 extending perpendicularly from cover main part 226. At its free end, horizontal connector 232 has a partially cylindrical portion 234 that extends about hinge bar 222. The partially cylindrical portion terminates before contacting horizontal connector 232 to define a slot 236 therebetween. Slot 236 cooperates with a stop flange on hinge bar 222 to allow selective removal of the cover in an open angular position of the cover.

Figure 20:
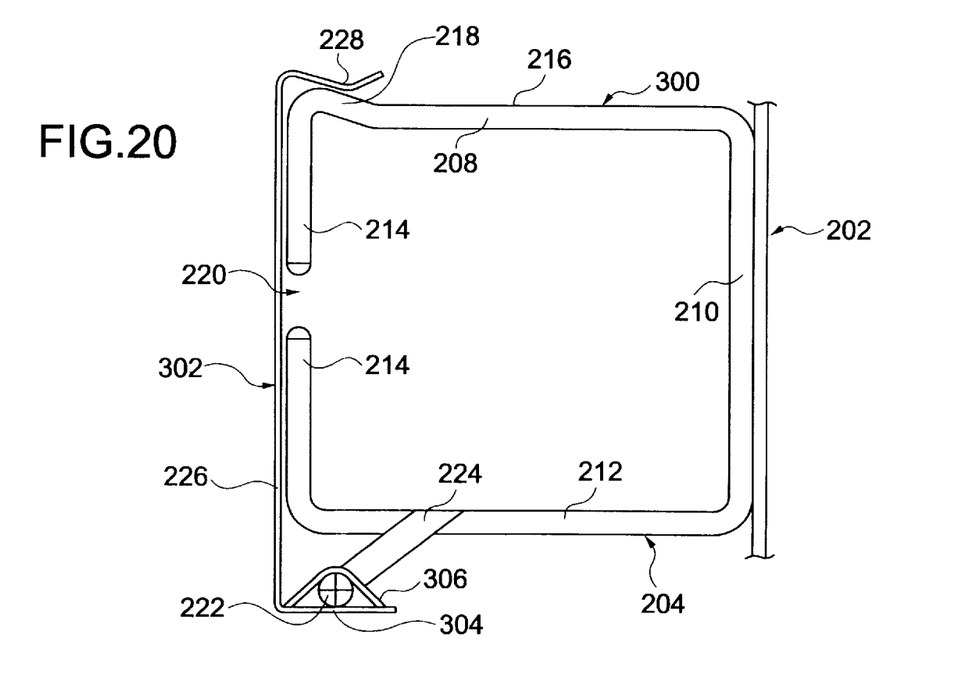
FIG. 20 is a partial, side elevational view of a cable management panel assembly according to a fourth embodiment of the present invention.

A cable management panel assembly 300 according to a fourth embodiment of the present invention is illustrated in FIG. 20. Features of the fourth embodiment which are similar to the third embodiment are identified with like reference numerals. Panel 202 and ring 204 of panel assembly 300 are substantially identical to the panel 202 and ring 204 of the second embodiment, respectively. The main difference between the third and fourth embodiments involves the cover, and particularly the coupling of the cover to the hinge bar.

In the fourth embodiment, cover 302 has a horizontal connector 304 extending perpendicularly from its cover main part 226. Horizontal connector 304 has a cut and deformed section forming a loop 306. Loop 306 has the same basic configuration as fixed tabs 110 and 114 of the panel assembly 100 of the second embodiment. Loop 306 and horizontal connector 304 provide a laterally closed axial extending passageway that receives hinge bar 222. When the stop flange is located in an angular portion adjacent the horizontal connector, the cover can be mounted or removed from the hinge bar in the same manner as passing a stop flange through a slot, such as slot 236 of panel assembly 200.

While particular embodiments have been chosen to illustrate the invention, it would be understood by those skilled in the art that various changes and modifications can be made therein without departing from the scope of the invention as defined in the appended claims.

What is claimed is:

1. A cable management panel assembly, comprising:
    a panel having oppositely directed first and second surfaces and extending along a longitudinal axis;
    a first set of first rings mounted on and extending outwardly from said first surface of said panel, said first rings being spaced along said longitudinal axis, each of said first rings having an opening extending laterally therethrough; and
    a first cover coupled to said first rings and movable between a closed position extending over and closing said openings and an open position spaced from said openings to allow cables to pass laterally into and out of said rings.

2. A cable management panel assembly according to claim 1 wherein
    said cover is pivotally coupled to said rings for pivotal movement between said closed and open positions.

3. A cable management panel assembly according to claim 1 wherein
    said first rings are fixedly secured to said panel.

4. A cable management panel assembly according to claim 1 wherein
    each of said first rings comprises first, second, third and fourth sections, with said first and second sections thereof being connected by a bend, with said second and third sections thereof being connected by a bend, with said third and fourth sections thereof being connected by a bend and with said fourth and first sections thereof being spaced to define said opening thereof therebetween.

5. A cable management panel assembly according to claim 4 wherein
    each said second section is attached to said panel; and
    each said first section comprises a main portion extending generally outwardly from said first surface and an end portion extending at an obtuse angle to said main portion.

6. A cable management panel assembly according to claim 5 wherein
    said cover comprises a main part extending over said openings in said closed position and a latch part angularly extending from said main part and engaging said end portions of said first rings to retain releasably said cover in said closed position.

7. A cable management panel assembly according to claim 6 wherein
    said latch part comprises an inner segment extending at an acute angle from said main part and an outer segment extending at an obtuse angle to said inner segment.

8. A cable management panel assembly according to claim 4 wherein
    at least one of said first rings has said second section thereof attached to said panel, and comprises a hinge bar extending from said bend between said third and fourth sections thereof, parallel to said longitudinal axis; and said cover comprises a main part extending over said opening in said closed position and a hinge part extending about and rotatably coupled to said hinge bar.

9. A cable management panel assembly according to claim 8 wherein said hinge bar comprises a stop flange extending radially from one end thereof beyond a lateral periphery of said hinge bar; and said hinge part comprises a longitudinal slot therein which slidably receives and allows said stop flange to pass therethrough to allow said hinge part to be engaged and disengaged from said hinge bar in one angular position of said cover relative to said first rings, said stop flange abutting a longitudinal end of said hinge part to retain said hinge part on said hinge bar in other angular positions of said cover relative to said first rings.

10. A cable management panel assembly according to claim 9 wherein said hinge part comprises a rolled portion of said cover, with said longitudinal slot being defined between a free edge of said rolled portion and a facing surface of said main part.

11. A cable management panel assembly according to claim 4 wherein two of said first rings have said second sections thereof attached to said panel, and comprise first and second hinge bars, respectively, extending from said bends between said third and fourth sections thereof parallel to said longitudinal axis;

said cover comprises a main part extending over said openings in said closed position and first and second hinge parts extending about and rotatably coupled to said first and second hinge bars, respectively;

first and second stop flanges extend radially from ends of said first and second hinge bars, respectively, beyond lateral peripheries of said hinge is bars; and first and second longitudinal slots in said first and second hinge parts, respectively, slidably receive and allow said stop flanges to pass therethrough to allow said hinge parts to be engaged and disengaged from said hinge bars in one angular position of said cover relative to said first rings, said stop flanges abutting longitudinal ends of said hinge parts to retain said hinge parts on said hinge bars in other angular positions of said cover relative to said first rings.

12. A cable management panel assembly according to claim 11 wherein each said hinge part comprises a rolled portion of said cover, with said longitudinal slot thereof being defined between a free edge of said rolled portion and a facing surface of said main part.

13. A cable management panel assembly according to claim 1 wherein said panel comprises gripping members integrally formed and extending laterally outwardly from a main section of said panel; and said rings are coupled by a frame, said frame having extensions engaged with said gripping members to attach said frame and said panel.

14. A cable management panel assembly according to claim 13 wherein said gripping members comprise first tabs stamped out of said panel, each of said first tabs having opposite ends coupled to said main section of said panel.

15. A cable management panel assembly according to claim 14 wherein said gripping members comprise resilient second tabs stamped out of said panel, each of said second tabs having a first end coupled to said main section of said panel, a second end spaced from said main section by a distance less than a width of one of said extensions of said frame and a middle section shaped to receive one of said extensions.

16. A cable management panel assembly according to claim 15 wherein said first tabs are on one end of said panel and said second tabs are on a second end of said panel.

17. A cable management panel assembly according to claim 13 wherein said gripping members comprise resilient second tabs stamped out of said panel, each of said second tabs having a first end coupled to said main section of said panel, a second end spaced from said main section by a distance less than a width of said extension of said frame and a middle section shaped to receive said extensions.

18. A cable management panel assembly according to claim 1 wherein a second set of second rings are mounted on and extend from said second surface of said panel, said second rings being spaced along said longitudinal axis, each of said second rings having a opening extending laterally therethrough; and a second cover coupled to said second rings and movable between a closed position extending over and closing said openings of said second rings and an open position spaced from said openings of said second rings to allow cables to pass laterally into and out of said second rings.

19. A cable management panel assembly, comprising:

a panel having oppositely directed first and second surfaces extending along a longitudinal axis;

a first set of first rings fixedly mounted on and extending outwardly from said first surface of said panel, said first rings being spaced along said longitudinal axis, each of said first rings having first, second, third and fourth sections with said first and second sections thereof being connected by a bend, with said second and third sections thereof being connected by a bend, with said third and fourth sections thereof being connected by a bend and with said fourth and first sections thereof being spaced to define an opening thereof therebetween, each said second section being attached to said panel, each said first section having a main portion extending generally outwardly from said first surface and an end portion extending at an obtuse angle to said main portion thereof;

a first cover coupled to said first rings and movable between a closed position extending and closing said openings and an open position spaced from said openings to allow cables to pass laterally into and out of said rings, said first cover having a main part extending over said openings in said closed position and a latch part angularly extending from said main part and engaging said end portions of said first rings to retain releaseably said cover in said closed position, said latch part having an inner segment extending at an acute angle from said main part and an outer segment extending at an obtuse angle to said inner segment;

first and second hinge bars on two of said first rings, respectively, extending from said bends between said third and fourth sections thereof parallel to said longitudinal axis;

first and second hinge parts on said first cover extending about and rotatably coupled to said first and second hinge bars, respectively;

first and second stop flanges extending radially from ends of said first and second hinge bars, respectively, beyond a lateral periphery of the respective hinge bar; and first and second longitudinal slots in said first and second hinge parts, respectively, slidably receiving and allowing said flanges to pass therethrough to allow said hinge parts to be disengaged from said hinge bars in one angular position of said cover relative to said first rings, and abutting longitudinal ends of said hinge parts to retain said hinge parts on said hinge bars in other angular positions of said cover relative to said first rings.

20. A cable management panel assembly according to claim 19 wherein each said hinge part comprises a rolled portion of said cover, with said longitudinal slot thereof being defined between a free edge of said rolled portion and a facing surface of said main part.

21. A cable management panel assembly according to claim 20 wherein said panel comprises gripping members integrally formed and extending laterally outwardly from a main section of said panel; and said rings are coupled by a frame, said frame having extensions engaged with said gripping members to attach said frame and said panel.

22. A cable management panel assembly according to claim 21 wherein said gripping members comprise first tabs stamped out of said panel, each of said first tabs having opposite ends coupled to said main section of said panel.

23. A cable management panel assembly according to claim 22 wherein said gripping members comprise resilient second tabs stamped out of said panel, each of said second tabs having a first end coupled to said main section of said panel, a second end spaced from said main section by a distance less than a width of one of said extensions of said frame and a middle section shaped to receive one of said extensions.

24. A cable management panel assembly according to claim 20 wherein a second set of rings are mounted on and extend from said second surface of said panel, said second rings being spaced along said longitudinal axis, each of said second rings having a opening extending laterally therethrough; and a second cover coupled to said second rings and movable between a closed position extending over and closing spaced openings of said second rings and an open position said from said openings of said second rings to allow cables to pass laterally into and out of said second rings.

* * * * *